May 23, 1944.  A. S. MARTIN  2,349,447
EXPANDING CHUCK
Filed Dec. 8, 1943  2 Sheets-Sheet 1
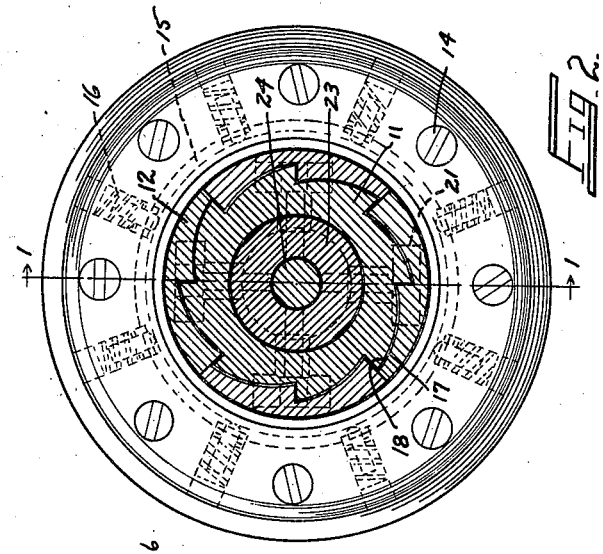
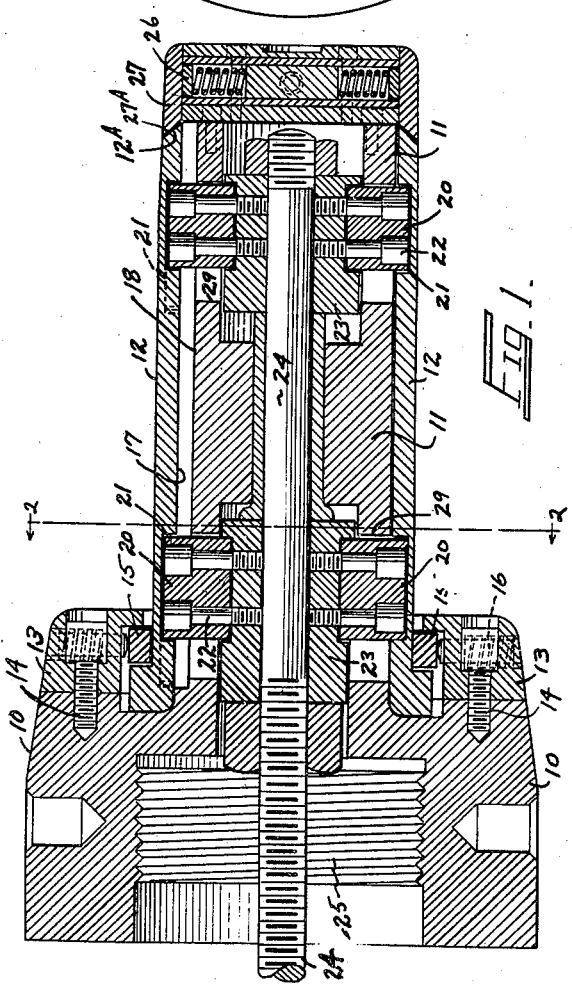
Andrew S. Martin
Inventor
W. B. Harpman
Attorney May 23, 1944.  A. S. MARTIN  2,349,447
EXPANDING CHUCK
Filed Dec. 8, 1943  2 Sheets-Sheet 2
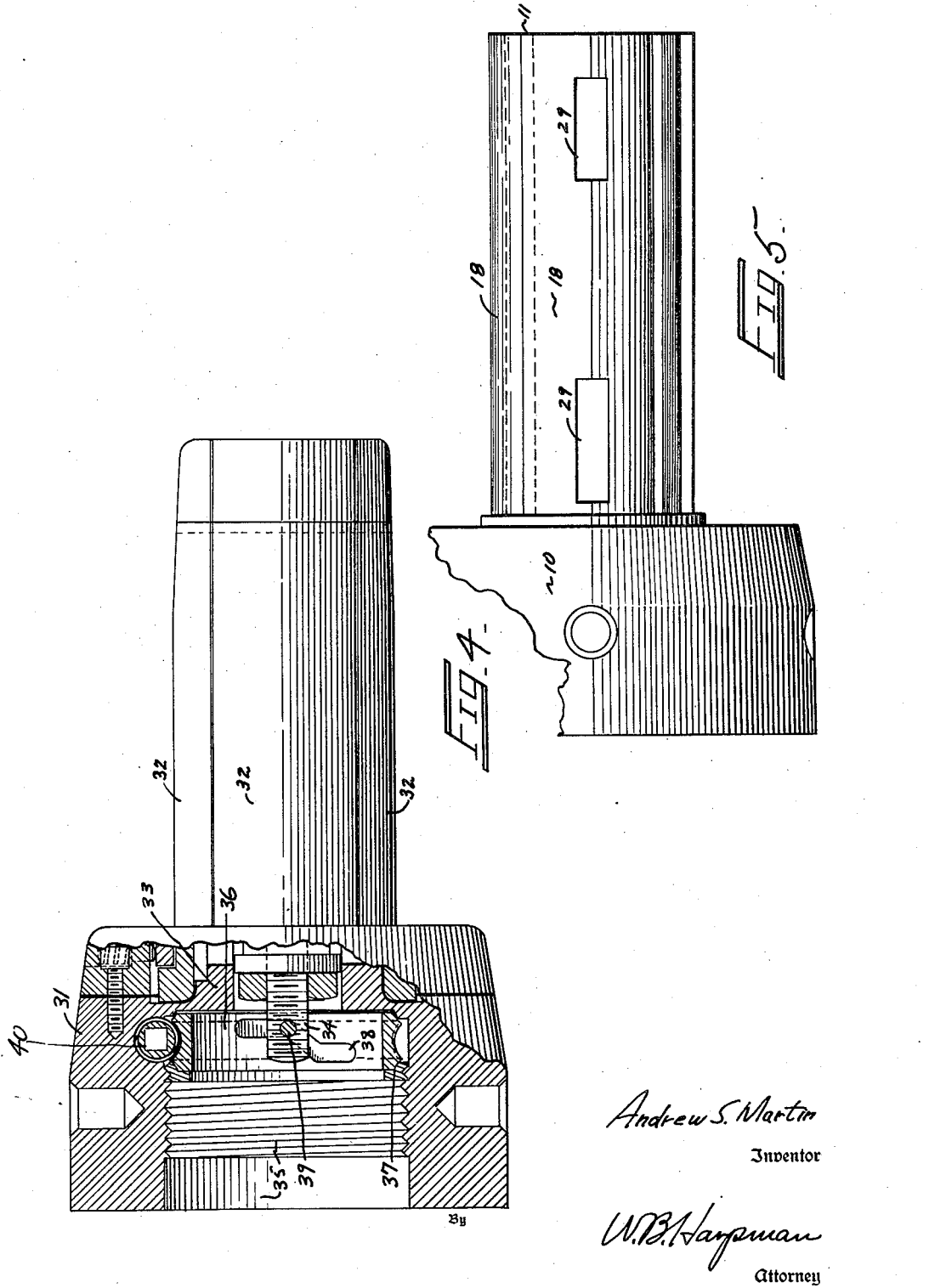
Andrew S. Martin
Inventor
W. B. Harpman
Attorney Patented May 23, 1944

2,349,447

UNITED STATES PATENT OFFICE 2,349,447

EXPANDING CHUCK

Andrew S. Martin, Salem, Ohio

Application December 8, 1943, Serial No. 513,655

4 Claims. (Cl. 279—2)

This invention relates to machine tools and more particularly to an expanding chuck adapted to form a material holding portion of a lathe or similar machine tool.

The principal object of the invention is the provision of an expanding chuck which will engage the interior of a tubular object placed thereover.

A further object of the invention is the provision of an expanding chuck which will engage a tubular object placed thereon, upon the interior surfaces thereof, over the entire area of the chuck and in no way mar, scratch, line or otherwise disfigure the interior of the object held.

A still further object of the invention is the provision of an expanding chuck adapted to be positioned on a lathe or similar machine and capable of automatic operation as by an air cylinder.

A still further object of the invention is the provision of an expanding chuck adapted to be positioned on a lathe or similar machine and capable of manual operation as by key engagement with the mechanism thereof through the arbor portion thereof.

The expanding chuck described herein has been designed to facilitate the handling of tubular articles during machining operation so as to in no way mar, scratch, or line the interior surfaces thereof. For example, in the manufacture of shell casings, the forgings employed must necessarily have their exterior surfaces machined prior to the deep drawing operations which form the actual shell case. With the devices heretofore employed with machine tools for the purpose of holding a forging during a machining operation, the interior of the forging would become lined or grooved by the engagement of the expanding portions of the device thereagainst. In the consequent deep drawing operation, the lines or grooves thereby formed resulted in the fracture of the shell casing and hence its discard due to its inability to be employed in its designated capacity. The device of the invention when attached to a lathe and in effect forming a portion thereof, holds a shell forging or any other tubular article in position thereon firmly in no way marring, grooving or otherwise mutilating the interior surface of the article.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings wherein:

Figure 1 is a cross sectional side elevation of the expanding chuck adapted for automatic operation as by an air cylinder. Lines 1—1 on Figure 2 indicate the approximate cross section illustrated.

Figure 2 is a cross sectional side elevation taken on lines 2—2 of Figure 1.

Figure 3 is a bottom view of an expanding sleeve portion of the device illustrated in Figure 1.

Figure 4 is a side elevation with parts broken away of an expanding chuck formed in accordance with the invention and adapted for manual operation.

Figure 5 is a side elevation with parts broken away illustrating the body member of the chuck.

By referring to the drawings and Figures 1 and 2 in particular, it will be seen that the device consists of an arbor portion 10 having an extending chuck body portion 11 thereon. Four equally sized, longitudinally extending sleeve portions 12 are provided and are positioned on the chuck body 11 by means of a chuck face cap 13 which in turn is affixed to the arbor portion 10 by means of a plurality of screws 14. The innermost ends of the several expanding sleeves 12 are positioned within an annular cut-out area formed primarily in the chuck face cap 13 and partially within the arbor portion 10 and are held therein by a collapsible split ring indicated by the numeral 15 which in turn is held against the exterior surfaces of the several expansible sleeve portions 12 by a plurality of spring pressed members 16 positioned radially thereabout and within openings in the chuck face cap 13. The normal position of the several expansible sleeve portions 12 is, therefore, in closed (relatively small diameter) position due to the cumulative action of the spring pressed members 16 engaging the slidable, collapsible ring 15 which in turn directly engages the several expansible sleeve portions 12. A tubular object may, therefore, readily be positioned over the several expending sleeve portions 12 which may be expanded outwardly so as to hold the object. Means have been incorporated in the chuck assembly for imparting rotating and expanding action to the several sleeve portions 12 and such means consist of the formation of each of the interior surfaces of the sleeve portions 12 of a plurality of cam-like surfaces 17 which normally rest on a plurality of similarly formed cam-like surfaces 18 on the exterior of the chuck body 11. In order that the several expanding sleeve portions 12 may be revolved with respect to the chuck body 11 so as to cause their cams 17 to slide on the cames 18 and hence expand, means have been positioned within the chuck body 11 for partially rotating the said expanding sleeve portions 12 with respect thereto. The said means consist of a purality of moving cams 20 which are positioned in cam pockets 21 formed in the interior surfaces of the expanding sleeve portions 12 by means of a plurality of bolts 22 which in turn engage a cam spider bushing 23, which bushing 23 is affixed to an actuating rod 24 which in turn passes through the enlarged threaded interior 25 of the arbor 10 and chuck body 11 and is also attached to means for imparting movement thereto (not shown) so that the moving cams 20 will slidably engage the moving cam shaped pockets 21 in the interior of the expanding sleeve portions 12 and hence move the same in a partial rotating action about the chuck body 11 thereby causing the expanding sleeve portions 12 to slide sidewardly and outwardly on the plurality of cams 18 on the chuck body 11 and thus expand against the interior of any tubular object that may be positioned thereon.

In the drawings the construction illustrated shows four equally sized expanding sleeve sections 12 which, therefore, necessitate the employment of four sets of moving cams 20, it being observed that the moving cam arrangement is duplicated and that the forward group is actuated by an extension of the rod 24 so that revolving action is imparted to the expanding sleeve portions 12 near both ends thereof. The resulting expanding motion is equal over the entire area of the chuck. The extreme outer end of the expanding chuck is provided with a separate end assembly attached thereto, which assembly is similar in construction to the collapsible split ring 15 and spring pressed members 16 heretofore described. However, the normal tendency of the plurality of spring pressed members 26 is to contract the end assembly, the outermost portion of which consists of a plurality of curved segments 27 which form extensions of the expanding sleeves 12 and which are expanded by the motion of the expanding sleeves 12 as end portions 12A thereof underlie end portions 27A of the segments 27.

By referring to Figure 3 of the drawings, a bottom elevation showing the interior of one of the expanding sleeves 12 may be seen and the moving cam pockets 21 therein are illustrated, it being observed that the pockets 21 are so formed that longitudinal movement of the moving cams 20 therein cause the same to bear against the angular surfaces 28 of the pockets and hence cause the sleeves 12 to rotate as they are incapable of longitudinal movement and capable of rotating movement only. The moving cams 20 are illustrated in the several figures and it will be observed that their exterior shape compares with the interior shape of the pockets 21 formed in the inner surface of the expanding sleeves 12 of the device.

The invention resides in the combination of the moving cams 20 and moving cam pockets 21 and the longitudinally extending cam surfaces 17 and 18 formed on the interior of the expanding sleeve portions 12 and the exterior of the chuck body 19, respectively, and the manner in which the moving cams 20 are motivated. It will thus be seen that the several expanding sleeves 12 are normally held in close relation to each other and to the chuck body 11 by means of the plurality of spring pressed members 16 and that they are expanded, as to engage a tubular object positioned thereover, by the movement of the rod 24 which in turn moves the cam spider bushings 23 and through the bolts 22 the moving cams 20 which engage the cam shaped pockets 21 formed in the interior surfaces of the expanding sleeves 12 and hence imparts rotating movement thereto which causes the same to ride outwardly on the longitudinally positioned cam surfaces 17 and 18 on the inner and outer surfaces of the expanding sleeves 12 and the chuck body 11 respectively. It will be observed that the plurality of bolts 22 which hold the moving cams 20 pass through slots 29 formed in the chuck body 11. The depth of the moving cam pockets 21 are sufficient, with respect to the height of the moving cams 20, to insure the full expanding action of the sleeves 12 necessary. The moving cam pockets 21 are formed, as may be seen in Figure 3, with angular portions 30 so that the reverse (collapsing) rotation of the movable portions of the device is insured by the reverse movement of the rod 24 and hence the moving cams 20 which will engage the angular surfaces 30 of the cam pockets 21.

It will be obvious to those skilled in the art that modifications in the device are possible and particularly with respect to the actuating means employed. In Figure 4 of the drawings, a manually operated device is shown wherein the arbor is indicated by the numeral 31, the several expanding sleeves by the numeral 32 and the body portion of the chuck by the numeral 33. It will be observed that the rod which actuates the moving cams and which compares with the rod 24 heretofore described is indicated in Figure 4 by the numeral 34 and that it terminates within the hollowed-out interior 35 of the arbor portion 31 of the device within the area defined by a ring gear 36 which is rotatably positioned in the arbor portion 31 of the device by means of a retaining ring 37 eccentrically formed grooves 38 in the interior surface of the ring gear 36 are adapted to engage a pin 39 positioned through the end of the rod 34 so that rotating movement applied to the gear ring 36 will cause the pin 39 to follow the pattern of the grooves 38 and hence move the rod 34 inwardly or outwardly. In order that the ring gear 36 may be rotated, its outer surface is provided with gear teeth and is adapted to engage a worm gear shaft 40 which is positioned in the arbor so as to engage the ring gear and which may be manually moved by engagement of a suitably shaped key therewith. In other respects the modification is exactly the same as that heretofore illustrated and described in Figures 1, 2 and 3.

In Figure 5 a side elevation of the device is shown with the several expanding sleeve portions 12 removed, it being observed that the plurality of longitudinally extending cam surfaces 18 are thus shown and that the slots 29 in which the bolts 22 and moving cams 20 are positioned are illustrated.

It will thus be seen that a practical and efficient expanding chuck has been designed which is entirely capable of an indicated purpose.

Having thus described my invention, what I claim is:

1. In an expanding chuck, the combination of an arbor having a hollow body extending therefrom, a plurality of longitudinally extending raised cam areas thereon, a plurality of slots in said body, expanding sleeve members positioned around said body, each of the said sleeve members having a plurality of longitudinally extending raised cam areas on its inner surface, matching the raised cam areas on the said body, and means for rotating the said sleeve members about the said body to cause the said cam areas to engage and move the said sleeve members outwardly.

2. In an expanding chuck, the combination of an arbor having a hollow body extending therefrom, a plurality of longitudinally extending raised cam areas thereon, a plurality of slots in said body, expanding sleeve members positioned around said body, each of the said sleeve members having a plurality of longitudinally extending raised cam areas on its inner surface, matching the raised cam areas on the said body, and means for rotating the said sleeve members about the said body to cause the said cam areas to engage and move the said sleeve members outwardly, said means comprising a plurality of moving cams positioned through the said slots and engaging the said sleeve members, a moving rod in the said hollow body, the said moving cams attached thereto for movement thereby, the said sleeve members having cam shaped pockets formed therein, in which the said moving cams engage.

3. In an expanding chuck, including a chuck body and a plurality of sleeve members positioned thereabout, means for moving the said sleeve members over a plurality of raised cam areas on the body of the chuck, so as to result in an expanding motion thereof, said means including cam shaped pockets formed in the said sleeve members and moving cams positioned in slots in the said body and engaging the said cam pockets, and means attached to the said moving cams for imparting longitudinally directed movement thereto, so as to cause the moving cams to engage the cam shaped pockets in the sleeve members and impart rotating movement thereto.

4. An expanding chuck including an arbor, a body extending therefrom, cams formed lengthwise on said body, sleeve portions placed about said body, cams formed lengthwise on the inner surfaces of said sleeve portions, slots in the said body, the interior of the said body being hollow, cam shaped pockets formed in the said sleeve portions, moving cams positioned in the said slots and engaging the said cam shaped pockets, means in the said hollow body for moving the said moving cams, so as to cause the said sleeve portions to rotate about the said body and move outwardly on the said cams formed lengthwise thereon, said means including a spider bushing attached to the said moving cams, a rod attached to the said spider bushing, and a pin in said rod, a ring gear in said arbor, a worm gear shaft for rotating the said ring gear, grooves formed in the inner surface of the ring gear, the said pin engaging the said grooves, the said grooves shaped so that rotation of the ring gear imparts lengthwise motion to the pin and hence the rod and the moving cams attached indirectly thereto, the said worm gear shaft adapted to be revolved by a key.

ANDREW S. MARTIN.